Patented Mar. 30, 1948

2,438,715

UNITED STATES PATENT OFFICE 2,438,715

PURIFICATION OF DEHYDROCORTICOSTERONE ACETATE

Stewart M. Miller and Jacob van de Kamp, Westfield, N. J., assignors to Merck & Co., Inc., Rahway, N. J., a corporation of New Jersey No Drawing. Application April 13, 1946,
Serial No. 662,105

2 Claims. (Cl. 260—397.4)

This invention relates to the recovery and isolation of dehydrocorticosterone acetate in an improved state of purity from reaction mixtures containing this hormonal substance. More particularly, our invention is concerned with a new and improved process for the recovery of 3,11,20-triketo-Δ⁴,⁵-21-acetoxypregnene (dehydrocorticosterone acetate) from reaction mixtures containing this product by a procedure which permits the obtainment of the hormonal substance in a higher state of purity and in considerably higher yields than previously possible with the recovery processes now known in the art.

Dehydrocorticosterone, one of the important adrenal cortex hormones, has heretofore been available only in very minute quantities because of the difficulty of preparing the hormone in any substantial amount from the limited natural sources available. In attempts to render the hormone available in greater amounts, the prior art has developed a method for synthesizing the hormone in which it is obtained in the form of its acetate, 3,11,20-triketo-Δ⁴,⁵-21-acetoxypregnene, at the end of a long procedure starting with a relatively abundant naturally-occurring substance. This synthesis has been unsatisfactory, however, in that the final step has given such low yields of the desired hormonal substance, dehydrocorticosterone acetate, that the preparation of the hormone by synthesis has been economically impractical.

The primary object of our invention is to provide an improved procedure for the isolation and purification of dehydrocorticosterone acetate from the crude reaction mixture in which it is produced as a result of this synthesis. This product, 3,11,20-triketo-Δ⁴,⁵-21-acetoxypregnene, is the result of a difficult, tedious, and costly procedure involving a large number of chemical reactions of intricate character. The principal aim of our invention is to make it possible to recover dehydrocorticosterone acetate in a higher degree of purity and in better yields than previously possible, thereby greatly improving the synthetic process as a means of securing the pure hormonal substance in economically feasible amounts.

In the synthesis of dehydrocorticosterone acetate (3,11,20-triketo-Δ⁴,⁵-21-acetoxypregnene) as described in the literature by Lardon and Reichstein, Helvetica Chemica Acta 26, 747–755 (1943), there is obtained a crude reaction mixture by debrominating 3,11,20-triketo-4-bromo-21-acetoxypregnane by refluxing the 4-bromo compound in pyridine. By this procedure dehydrocorticosterone acetate is secured, this desired product being contaminated, however, with a multitude of impurities which are extremely difficult to remove. Lardon and Reichstein have described a procedure wherein water-soluble, basic, and acidic compounds of the reaction mixture are taken into account, these authors then proceeding to separation by means of chromatographic methods. At this stage, however, efficient separation of the highly complex reaction mixture does not occur.

We have found that the impurities which are present along with the dehydrocorticosterone acetate in the reaction mixture, after removal of the water-soluble, basic and acidic compounds, may be classed into various groups, among which are the higher molecular weight condensation products and complexes, oils and tars, and low-melting crystallizable mixtures. Colored components may be present in all of these products to a greater or less extent. In our improved procedure for recovering dehydrocorticosterone acetate in high yield and in the substantially pure state, we first extract the acidic and basic contaminents, as in the prior art, but we then proceed to remove the other impurities present, which impurities must be eliminated if the substantially pure hormonal substance is to be obtained in high yields.

In the recovery and purification procedure described in the literature, after debromination of 3,11,20-triketo-4-bromo-21-acetoxypregnane, the reaction mixture is evaporated under reduced pressure to remove the pyridine. The residue is then taken up in a large volume of ether, and washed, successively, with dilute hydrochloric acid, with sodium carbonate solution and with water. It is then dried over sodium sulphate and concentrated. The resulting product is chromatographed over a column of alumina. Upon elution with benzene, the first benzene eluates give crystals which melt at a relatively low temperature without a sharp melting point. The later benzene eluates, and benzene-ether eluates, furnish substantially colorless crystals melting at 175–178°, but the product is obtained only in low yields, and in none too satisfactory a state of purity.

We have found that the procedure described in the prior art for the recovery of dehydrocorticosterone acetate from the crude reaction mixture obtained by debromination of 3,11,20-triketo-4-bromo-21-acetoxypregnane does not effectively remove the complex mixtures of impurities present therein, nor does it yield dehydrocorticosterone acetate in a sufficiently high state of purity and in satisfactory yields. Some of the impurities present in the reaction mixture are closely related, both in structure and in properties, to the desired hormonal product. Unfortunately, in the purification procedures heretofore available, the dehydrocorticosterone acetate tends to be removed and lost, along with the impurities, during the successive recrystalization, washing and other purification steps.

In our improved procedure, wherein the specific types of impurities present along with the dehydrocorticosterone acetate are removed by specific procedures designed to obtain maximum recovery of products, we are able to secure the product in high yields and in a high state of purity. Our procedure permits the removal of those impurities which may be classed as the higher molecular weight condensation products and complexes, oils and tars, and low-melting crystallizable mixtures, all of which impurities are more or less dark in color. If left in the hormone, not only would its purity be much reduced, but they would greatly darken its color.

In our improved procedure we follow the purification method described in the chemical literature to the extent that we first extract acidic and basic impurities present with the dehydrocorticosterone acetate in the reaction mixture. The crude neutral residue, obtained after evaporation of the solvent in which the product is held in solution during the extraction procedure, is then treated in accordance with our improved method. This residue is dissolved in benzene and, upon the addition of ether, the higher molecular weight condensation products and complexes are thrown down in the form of a flocculent precipitate. After removal of the precipitate by filtration, decantation, centrifugation, or otherwise, the filtrate, which contains the desired dehydrocorticosterone acetate product, is evaporated to dryness.

This dry product is next treated to free it from oily and tarry impurities. This is accomplished by washing the residue with ether, and then with a mixture of acetone and ether. This treatment removes nearly all colored and low-melting crystallizable materials. The final traces of color in the product are removed by adsorption on activated alumina, the product being treated in the form of a solution in ether-chloroform. After removing the solvent, recrystallization from a mixture of methanol and water in the presence of a small amount of activated charcoal to remove any traces of impurities which may still remain results in pure, white crystals of dehydrocorticosterone acetate melting at 181–182.9° C. The product has a specific rotation of $(\alpha)_D^{25}$ 226°±3°. The yield is 32.6% based on the amount of 3,11,20-triketo-4-bromo-21-acetoxypregnane which was initially debrominated by refluxing in pyridine.

Hormonal material prepared in this way has been found to be identical with dehydrocorticosterone acetate as derived from natural sources. This is established by melting point determinations, mixed melting point determinations, specific rotation, carbon and hydrogen analyses, and by the ultra-violet adsorption spectrum, and bioassay.

As an example of our new improved procedure for recovering dehydrocorticosterone acetate in high yield and in a very high state of purity from reaction mixtures containing this hormone, the following may be given.

*Example*

A solution of 10.0 grams of 3,11,20-triketo-4-bromo-21-acetoxypregnane (melting point 185.6–186.3° C. corrected) in 250 milliliters of redistilled pyridine was refluxed for 5 hours. The pyridine was then removed under reduced pressure, less than atmospheric, and the residue taken up in 146 milliliters of chloroform. The resulting solution was first washed with 292 milliliters of water, then with 584 milliliters of 1 N hydrochloric acid, and then with 584 milliliters of a saturated solution of sodium bicarbonate. Finally it was washed with 292 milliliters of water.

The chloroform layer separating was concentrated to dryness and the residue was then taken up in 38 milliliters of benzene. Impurities present in the benzene solution were then precipitated by adding 740 milliliters of absolute ether, and allowing the resulting flocculent precipitate to settle in the solution by standing for a period of several days.

The precipitate was then removed by filtration through "Supercel" filtration aid, and the filtrate concentrated to dryness. The dry residue was transferred to a filter and carefully ground in absolute ether. The product was washed with a total of 200 milliliters of absolute ether. The weight of the dry crude material at this point was 3.807 grams or 46% of the theoretically possible yield.

The material was next transferred to a 30 milliliter centrifuge tube and slurried in 4 milliliters of acetone. To the mixture there was then added 8 milliliters of absolute ether. The mixture was stirred until all lumps were reduced. The liquors were then removed by centrifuging and decanting. Three more washes, each with 9 milliliters of absolute ether, were given the material. Its weight was now 3.200 grams (38.5% of the theoretically possible yield).

The material was next dissolved in a mixture of equal amounts of chloroform and absolute ether, and run through a 6 centimeter column of activated alumina which was 1 centimeter in diameter. More of the solvent mixture was kept draining through the column until practically no more crystallizable material was found in the eluate. The entire operation required about 400 milliliters of the mixture. The eluate was evaporated to dryness, leaving a residue weighing 2.982 grams (36% of the theoretical). The melting point of the product was 179.2–182° C. corrected, with slight previous sintering.

The residue was dissolved in 224 milliliters of methanol, filtered, and 510 milliliters of hot water added thereto. The mixture was chilled and seeded when it began to cloud. The product crystallized rapidly in fine needles. It was allowed to stand in the refrigerator overnight before filtering. The filter cake was then washed with 73 milliliters of a methanol-water mixture of the same concentration as the mother liquor. After drying it weighed 2.732 grams (33% of the theoretical weight), and had a melting point of 180.2–182° C. corrected. The specific rotation was $(\alpha)_D^{25} = +220° \pm 3°$ (concentration 0.673% in acetone solution).

Various changes and modifications may be made in our improved procedure, as described, without departing from the spirit and scope of the invention. These changes and modifications, to the extent that they are within the scope of the appended claims, are intended to be a part of our invention.

We claim:

1. The process of securing dehydrocorticosterone acetate, which comprises: treating a reaction product containing dehydrocorticosterone acetate in order to remove water-soluble basic and acidic impurities present therein; concentrating the resulting crude partly purified neutral residue; dissolving the crude residue in benzene; adding ether thereto in order to precipitate the higher molecular weight condensation products and complexes present as impurities therein; removing said higher molecular weight condensation products and complexes; evaporating the resulting solution containing dehydrocorticosterone acetate in substantially purified form to dryness; removing oily and tarry impurities present therein by washing the residue first with ether, and then with a mixture of acetone and ether; adsorbing colored impurities present therein by treating an ether-chloroform solution of said purified products on activated alumina; and crystallizing said product in the form of pure white crystals of dehydrocorticosterone acetate.

2. The process of purifying a reaction mixture containing crude dehydrocorticosterone acetate in order to recover the said product in substantially pure form which comprises: dissolving the crude reaction mixture in chloroform; washing the resulting solution successively with water, hydrochloric acid and sodium bicarbonate solution; concentrating said washed chloroform solution to dryness; dissolving the dry residue in benzene; adding to the resulting benzene solution absolute ether in order to precipitate impurities; concentrating said benzene ether solution to dryness; treating said dry residue with absolute ether; washing said residue with a mixture of acetone and ether, and with ether alone; dissolving the residue in a mixture of chloroform and absolute ether; adsorbing impurities from said solution on activated alumina; evaporating the resulting purified solution to dryness; dissolving the resulting dry residue in methanol; adding hot water to said methanol solution; adsorbing impurities present in said resulting methanol-water solution by treatment with decolorizing carbon; and cooling said resulting solution in order to crystallize out therefrom dehydrocorticosterone acetate in the substantially pure state.

STEWART M. MILLER.
JACOB van de KAMP.

REFERENCES CITED

The following references are of record in the file of this patent:

UNITED STATES PATENTS

| Number | Name | Date |
|---|---|---|
| 2,166,877 | Reichstein | July 18, 1939 |
| 2,238,868 | Cartland | Apr. 15, 1941 |
| 2,403,683 | Reichstein | July 9, 1946 |
| 2,404,768 | Reichstein | July 23, 1946 |

OTHER REFERENCES

Ser. No. 202,126, Laqueur (A. P. C.) published Apr. 20, 1943.